(12) United States Patent
Kempf

(10) Patent No.: US 8,111,324 B2
(45) Date of Patent: Feb. 7, 2012

(54) APPARATUS AND METHOD FOR FILM SOURCE RECONSTRUCTION

(75) Inventor: Jeffrey M. Kempf, Allen, TX (US)

(73) Assignee: Texas Instruments Incorporated, Dallas, TX (US)

( * ) Notice: Subject to any disclaimer, the term of this patent is extended or adjusted under 35 U.S.C. 154(b) by 895 days.

(21) Appl. No.: 12/146,994

(22) Filed: Jun. 26, 2008

(65) Prior Publication Data

US 2009/0322940 A1 Dec. 31, 2009

(51) Int. Cl.
*H04N 7/01* (2006.01)

(52) U.S. Cl. ........ 348/448; 348/441; 348/451; 348/452; 348/453

(58) Field of Classification Search ................. None
See application file for complete search history.

(56) References Cited

U.S. PATENT DOCUMENTS

| | | | |
|---|---|---|---|
| 7,142,247 B2 * | 11/2006 | Jung | 348/452 |
| 7,280,155 B2 * | 10/2007 | Law et al. | 348/448 |
| 7,375,760 B2 | 5/2008 | Kempf et al. | |
| 7,787,048 B1 * | 8/2010 | Vojkovich et al. | 348/452 |

OTHER PUBLICATIONS

Ramer, Dan, "What the heck is 3:2 Pulldown?" DVDFILE.COM, http://www.dvdfile.com/news/special_report/production_a_z/3_. . . (5 pges).

* cited by examiner

*Primary Examiner* — Kristine Kincaid
*Assistant Examiner* — Oschta Montoya
(74) *Attorney, Agent, or Firm* — Wade J. Brady, III; Frederick J. Telecky, Jr

(57) ABSTRACT

A method for film reconstruction includes identifying motion tear artifacts within a plurality of video fields of a stream of video fields. The motion tear artifacts identified by analyzing the video fields using fuzzy logic. The method also includes comparing the analysis of one video field to the analysis of an immediately preceding video field to determine whether there is a relatively high level of motion tear artifacts within the video field or a relatively low level of motion tear artifacts within the video field. The method further includes identifying a pattern of temporal periodicity for the comparisons. The method also includes determining the cadence of the stream of video fields based on the pattern of temporal periodicity.

20 Claims, 5 Drawing Sheets

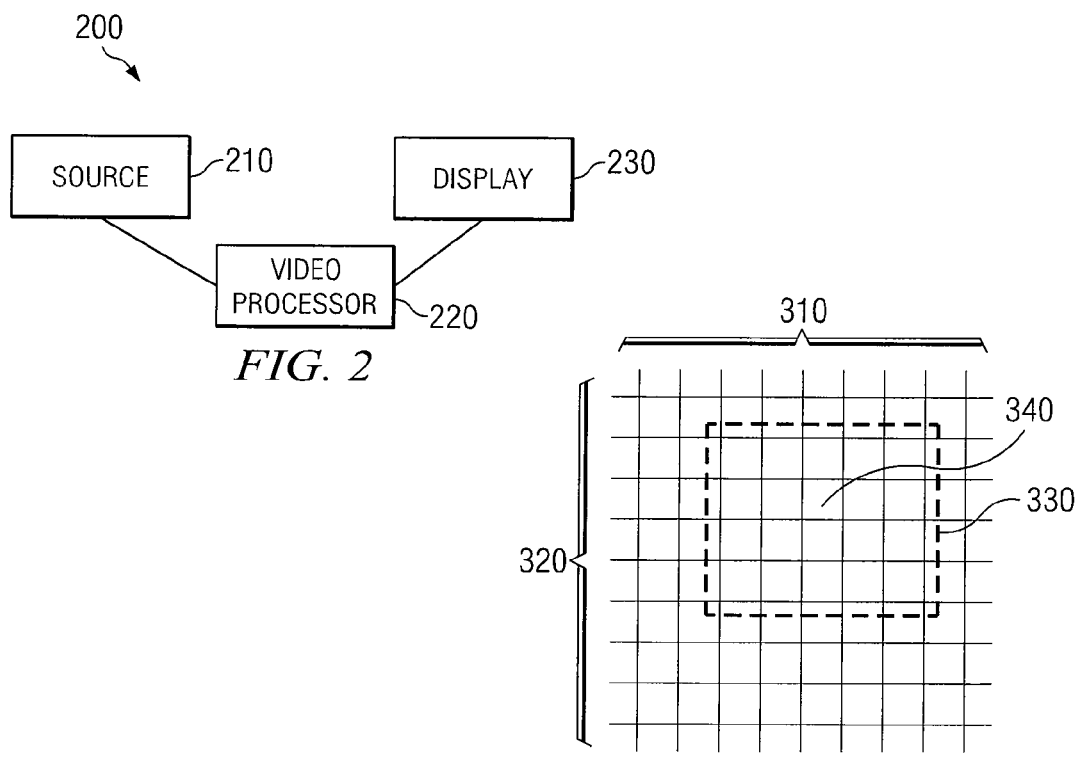
FIG. 2
FIG. 3
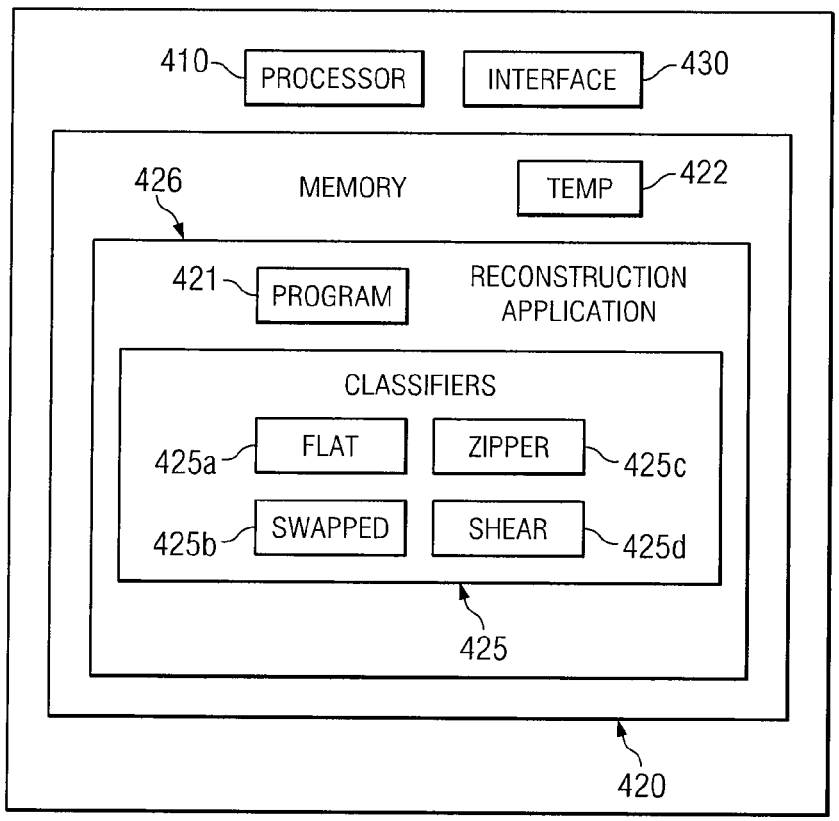
FIG. 4

APPARATUS AND METHOD FOR FILM SOURCE RECONSTRUCTION

TECHNICAL FIELD

This disclosure relates generally to image display systems and more particularly to film source reconstruction.

OVERVIEW

Progressive display devices often need scan-rate conversion of interlaced video signals to double the vertical resolution of each image field. To produce the sharpest image, it is desirable for the scan rate converter to be content dependent. In other words, the scan rate converter may analyze the motion patterns of an interlaced image sequence and determine the most suitable method for scan rate conversion, if at all. If the interlaced image sequence is created from a progressive source, such as film, then the scan rate converter must combine adjacent interlaced fields to form the original progressive frame. By performing this film mode detection and correctly jamming adjacent fields, a high amount of detail is produced in the resulting image.

Some techniques only employ motion values for film cadence detection. Other techniques employ either field differences, frame differences, or both. One problem with these techniques is that typical solutions only solve for 3:2 and/or 2:2 cadences. Another problem is that they often include too many false motion detections. They are also relatively slow at adapting to changes in the cadence of the source material. For example, when using frame difference, the temporal pattern for a 3:2 source is: 1,1,1,1,0,1,1,1,1,0, . . . ; thus it takes five fields to recognize a change in cadence.

SUMMARY

In accordance with the teachings of the present disclosure, a method for film reconstruction includes identifying motion tear artifacts within a plurality of video fields of a stream of video fields. The motion tear artifacts are identified by analyzing the video fields using fuzzy logic. The method also includes comparing the analysis of one video field to the analysis of an immediately preceding video field to determine whether there is a relatively high level of motion tear artifacts within the video field or a relatively low level of motion tear artifacts within the video field. The method further includes identifying a pattern of temporal periodicity for the comparisons. The method also includes determining the cadence of the stream of video fields based on the pattern of temporal periodicity.

A technical advantage of some embodiments of the present disclosure includes the ability to quickly and automatically identify the presence and/or type of cadence of a video source. Accordingly, a display device may be able to more accurately reproduce the image represented by the video source.

Other technical advantages of the present disclosure may be readily apparent to one skilled in the art from the following figures, descriptions, and claims. Moreover, while specific advantages have been enumerated above, various embodiments may include all, some, or none of the enumerated advantages.

BRIEF DESCRIPTION OF THE DRAWINGS

For a more complete understanding of the present disclosure, and for further features and advantages thereof, reference is now made to the following description taken in conjunction with the accompanying drawings, in which:

FIG. 2 is a block diagram of an overview of a display system capable of identifying the cadence of source material, in accordance with particular embodiments;

FIG. 3 is an enlarged view of individual pixels being analyzed by a video processor, in accordance with particular embodiments;

FIG. 4 is a block diagram of example components of a video processor, in accordance with particular embodiments;

DETAILED DESCRIPTION OF EXAMPLE EMBODIMENTS

Figure 1:
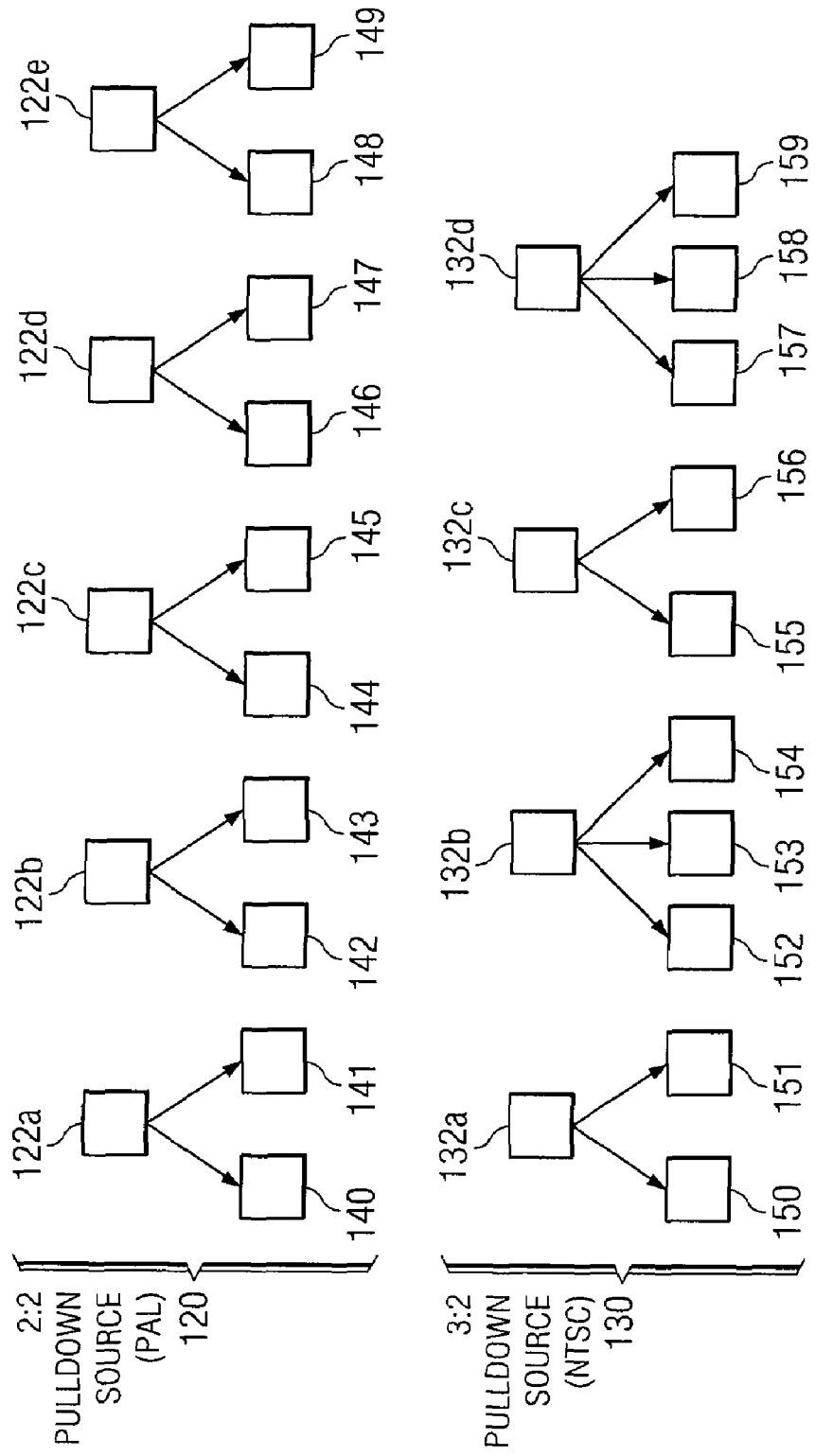
FIG. 1 is a block diagram showing how film is converted to video for two different video cadences, in accordance with particular embodiments.

FIG. 1 is a block diagram showing how film is converted to video for two different video cadences, in accordance with particular embodiments. The cadence of the video may be the repeating pattern of fields within a video signal. The two cadences illustrated in FIG. 1 include 2:2 pull-down 120 and 3:2 pull-down 130. 2:2 pull-down uses two fields of video for every frame of film. Accordingly, 2:2 pull-down 120 shows how ten sequential video fields, fields 140-149 may be created from five film frames, frames 122a-122e. 2:3 pull-down uses an alternating pattern of three fields a frame and then two fields for a frame. Accordingly, 3:2 pull-down 130 shows how ten sequential video fields, fields 150-159, may be created from four film frames, frames 132a-132d. In both instances video fields 140-149 and 150-159 may be interlaced video fields as described in more detail below. It should be noted that while only two different cadences are depicted, particular embodiments may work with any type of cadence (e.g., 3:2: 2:3) either currently used or still to be developed as well as material without any cadence (e.g., inherently interlaced sources).

Film is comprised of a series of frames. Each frame represents a single image that is to be displayed. These frames are originally recorded at 24 frames per second (fps) or 24 Hz. Different techniques exist for transferring the frames of film into fields for video. One technique, Phase Alternating Line (PAL), has a frequency of approximately 50 Hz. To create 50 Hz PAL video material, a 2:2 pull-down technique may be used in which every film frame is represented by two video fields. Another technique, National Television System Committee (NTSC), has a frequency of approximately 60 Hz. To create 60 Hz NTSC video material a 3:2 (or 2:3) pull-down technique may be used in which a first film frame is represented by three video fields, and a second film frame is represented by two video fields.

As can be seen in FIG. 1, 2:2 pull-down 120 creates two separate video fields from each film frame. For example, film frame 122a is represented by video fields 140 and 141. In particular embodiments, film frames 122 may originally be analog frames (e.g., the individual images captured on celluloid). The film frames may then be converted into digital video fields using, for example, a telecine machine. More specifically, the image of a single film frame may be represented by two separate video fields. Each video field may contain half the original image. Thus, to get the full image, the two video fields must be combined.

Each of video fields 140-149 may be broken down into pixels arranged in a plurality of vertical columns and horizontal rows. The number of rows and columns determines the resolution of the image (e.g., 720×1280). In particular embodiments, one video field may contain odd numbered rows and another video field may contain even numbered rows. For example, film frame 122b may be divided into video fields 142 and 143, with video field 142 comprised of the even numbered rows and video field 143 comprised of the odd numbered rows.

3:2 pull-down 130 creates a slightly different pattern of video fields 150-159. More specifically, the pattern alternates between three video fields per frame and two video fields per frame. The two video fields of frames 132a and 132c may be created in a similar fashion as the video fields created in 2:2 pull-down 120. Furthermore, two of the three video fields used for film frames 132b and 132d may be created similar to the video fields in 2:2 pull-down. The third video field may simply be a copy of one of the other video fields for the respective film frame. For example, video field 152 may comprise the even numbered rows of film frame 132b; video field 153 may comprise the odd numbered rows of film frame 132b; and video field 154 may comprise the even or the odd numbered rows of film frame 132b depending on whether it is copied from video field 152 or 153.

It is video fields 140-149 and/or 150-159 that may be stored and/or presented by source 210. For an interlaced device (e.g., a cathode ray tube (CRT) television) the video fields are simply displayed sequentially. Thus, there may be little need to worry about which video fields are to be combined. However, in a progressive display (e.g., a liquid crystal display (LCD) television) two interlaced video fields may be combined and displayed simultaneously. Thus, it may be desirable to determine the appropriate two video fields to be combined. More specifically, it may be desirable to avoid combining two video fields from two different film frames. If two video fields from separate film frames (e.g., video fields 143 and 144) were to be combined the resulting image would likely be degraded (e.g., comprise a relatively large number of motion tear artifacts). Thus, one of the functions of video processor 220 (discussed in detail below with respect to FIG. 2) is to recombine the appropriate video fields to reconstruct the image of film frames 122 or 132. To achieve this, video processor 220 needs to know whether or not the material has a cadence (e.g., is inherently interlaced or progressive) and if not what the cadence is so that it knows which video fields to combine.

FIG. 2 is a block diagram of an overview of a display system capable of identifying the cadence of source material, in accordance with particular embodiments. Display system 200 includes source 210, video processor 220, and display 230. While these are shown as separate blocks, one or more may be combined into a single device. For example, a television comprising a built-in DVD player may include all three blocks. In order to improve the quality of the image presented by display 230, it may be desirable to know the cadence of the material from source 210 so that video processor 220 may more accurately process the material. Accordingly, video processor 220 may look at the level of motion tear artifacts within a video field and the pattern of that level between video fields to aid in determining the cadence of the material from source 210. Motion tear artifacts may be defects which appear in a displayed image when portions of the image do not align with other adjacent portions of the image; it appears that part of the image has moved while the other part of the image has not.

Source 210 may comprise any combination of hardware, software, and encoded logic operable to store, generate, recall and/or convey material (e.g., video fields) to video processor 220. In particular embodiments, the material provided by source 210 may comprise interlaced video fields. These video fields may be based on material that was originally progressive, such as a movie recorded on film, or that was originally interlaced, such as a show broadcast by a television network. Regardless of the source or origin of the original material, the interlaced video fields are what source 210 may provide to video processor 220 for presentation on display 230. As mentioned above, the material provided by source 210 may be interlaced. That is, two separate fields, one containing the odd numbered horizontal lines and the other containing the even numbered horizontal lines, are used to represent a film frame.

Display 230 may comprise any combination of hardware, software, and encoded logic operable to present a video image. In particular embodiments, display 230 may be capable of presenting a progressive image. In other words, display 230 may present both the even and the odd horizontal lines of a frame simultaneously. For example, display 230 may be a plasma television/monitor, a liquid crystal display (LCD) television/monitor, a liquid crystal on silicon (LCoS) television/monitor, a digital light processing (DLP) television/monitor, an organic light emitting diode (OLED) television/monitor, or any other type of television/monitor capable of displaying a progressive image. Because display 230 may be a progressive display, it may be desirable for video processor 220 to combine interlaced video fields from source 210 before they are sent to display 230.

Video processor 220 may comprise any combination of hardware, software, and encoded logic operable to perform any processing of the material from source 210 before being presented by display 230. In general, video processor 220 may be responsible for taking the material from source 210 and preparing it for presentation by display 230. This may involve several different features, functions and steps. For purposes of this disclosure, the focus is on the ability of the video processor to recognize the cadence of interlaced material from source 210 and to generate progressive material for display 230. More specifically, because interlaced video fields may need to be combined together for display 230, it may be desirable to know whether a particular field is the third field of a second frame, the first field of a third frame or another field in an inherently interlaced stream of fields.

In particular embodiments, to identify the cadence of the material from source 210, video processor 220 may look for a pattern in the levels of motion tear between video fields (see FIG. 4 for additional details regarding how a video processor may look for patterns) of the material from source 210. For example, 2:2 pull-down material may have a repeating pattern of alternating between relatively high and low levels of motion tear; and 3:2 pull-down material may have a repeating pattern of relatively high, relatively low, relatively low, relatively high and then relatively low levels of motion tear. This is based, in part, on the premise that fields from the same frame may exhibit relatively less motion tear because an object can not "move" within a single frame, but fields from two separate frames may often have movement and thus may have a relatively higher level of motion tear artifacts.

FIG. 3 is an enlarged view of individual pixels being analyzed by a video processor, in accordance with particular embodiments. The enlarged view is only of a small portion of the pixels of a full frame. The portion depicted in FIG. 3 comprises several columns 310 and rows 320. For convenience, a single pixel, pixel 340, is being examined using, for example, fuzzy logic to determine whether the pixel exhibits any motion tear artifacts.

In analyzing a pixel to determine the presence of motion tear artifacts, a video processor may create observation window 330. Observation window 330 may allow the video processor to focus on a small subset of pixels. Observation window 330 may be approximately centered on the pixel currently being analyzed (e.g., pixel 340). In particular embodiments, observation window 330 may be four rows high and five columns wide. The size of observation window 330 may vary depending on the technique and/or test being used to detect motion tear artifacts. In some embodiments, the pixels within observation window 330 may comprise two rows from the current video field (e.g., the field comprising pixel 340 currently being analyzed) and two rows from the immediately prior video field. In other words the pixels depicted in FIG. 3 are from two sequential video fields that have been combined (or jammed) together. A set of two rows from the same video field may be referred to as field-paired or field-pair lines. Using the pixels within observation window 330 that surround pixel 340, the video processor may be able to determine whether pixel 340 comprises a motion tear artifact. This is done for each individual pixel of the current video field by moving observation window 330 so that it is approximately centered on each pixel being analyzed. All the identified motion tear artifacts for a particular video field may then be used to determine a total motion tear artifact score for the video field, as discussed below. The total motion tear artifact scores for the stream of video fields may then be used in determining the cadence of the source material as discussed in more detail below with respect to FIG. 4.

FIG. 4 is a block diagram of example components of video processor 220, in accordance with particular embodiments. More specifically, the illustrated embodiment of video processor 400 includes processor 410, memory 420, and interface 430. These components may work together to provide the ability to detect the cadence of source material based on a pattern of motion tear artifact scores associated with the video fields. In alternate embodiments, video processor 400 may comprise fewer or additional components. For example, in some embodiments video processor 400 may be implemented in hardware/firmware such as by an Application-Specific Integrated Circuit (ASIC).

Processor 410 may comprise any hardware able to execute software, and/or encoded logic operable to provide processing functionality for video processor 400. Depending on the embodiment, processor 410 may be a programmable logic device, a controller, a microcontroller, a microprocessor, any suitable processing device or circuit, or any combination of the preceding. Processor 410 may manage and implement, either alone or in conjunction with other video processor 400 components, the operation of video processor functionality. Such functionality may include determining the cadence of a stream of video fields received via interface 430. In doing so, processor 410 may be able to assess each pixel of a particular video field to determine whether it contains a motion tear artifact. Processor 410 may then add-up all the motion tear artifacts for the video field. Based on the total motion tear artifacts within each field, processor 410 may be able to determine a pattern from which the cadence of the material may be determined.

Memory 420 may include any suitable combination of hardware, software, and/or encoded logic operable to store information needed by video processor 400. For example, in particular embodiments, memory 420 may include reconstruction application 426 for storing instructions used by processor 410 and temporary storage 422 for storing intermediate calculations, results or data. In particular embodiments, memory 420 may include any form of volatile or non-volatile memory including, without limitation, magnetic media, optical media, random access memory (RAM), read only memory (ROM), removable media, or any other suitable local or remote memory component. Memory 420 may store any suitable data or information including software and encoded logic utilized by video processor 400. This information may be maintained in a listing, table, or other organization of information.

As mentioned above, the illustrated embodiment of memory 420 includes reconstruction application 426 and temporary storage 422. Reconstruction application 426 may include program 421 which may comprise instructions, logic, code or other such information used by processor 410. Reconstruction application 426 may also include classifiers 425 (discussed in more detail below) which may comprise several different fuzzy logic classifiers used to identify motion tear artifacts. Memory 420 may store one or more rules associated with each of classifiers 425. Also, as mentioned above, memory 420, in the depicted embodiment, includes temporary storage 422. The temporary data that may be stored in temporary storage 422 may include motion tear scores for a certain number of video fields, or representative pixels used in motion tear artifact detection.

Interface 430 may include any suitable combination of hardware, software and/or encoded logic operable to allow video processor 400 to send and receive video material. For example, interface 430 may include one or more of a coaxial input, a Radio Corporation of America (RCA) input, an S-video input, a component input, a High-Definition Multimedia Interface (HDMI) input, or any other port, connector or input that may be used to receive a stream of video fields. Furthermore, interface 430 may use one physical set of interfaces for receiving video fields and a different physical set of interface for sending video fields.

The following example is presented to provide a better understanding of how the components of video processor 400 may work in a particular embodiment to provide the ability to determine the cadence of source material from the motion tear artifacts that may be recognized using fuzzy logic.

Interface 430 may receive a stream of interlaced video fields for which video processor 400 does not know the cadence. Video processor 400 may need to de-interlace the video stream so as to provide a progressive image to a display device. To do so, video processor 400 may utilize processor 420 and reconstruction application 426 to determine the cadence of the stream of video fields. Knowing the cadence of the video fields may allow the video processor to more accurately reconstruct the film source.

Reconstruction application 426 may first specify that processor 410 is to combine the current field with the immediately preceding field to form a temporary frame according to instructions within program 421. The temporary frame may be stored in temporary storage 422. Reconstruction application 426 may then indicate that the temporary frame is to be analyzed, for example using fuzzy logic, to determine the existence and/or extent of any motion tear artifacts. In particular embodiments, this may be done at the pixel level. More specifically, for each pixel of the current video field, processor 410 may make a determination as to whether or not the pixel has a motion tear artifact. In determining whether a particular pixel exhibits a motion tear artifact, processor 410 may look at the surrounding pixels. For example, in some embodiments processor 410 may examine a four row by five column subset of pixels centered on the pixel currently be assessed. This subset may be referred to as an observation window. It should be noted that while only pixels of the current field are being assessed, the observation window includes pixels from both video fields that make up the temporary frame.

In some embodiments, as part of the analysis of a particular video field, reconstruction application 426 may have processor 410 quantize each pixel to a single bit. For example, program 421 may comprise code that may enable processor 410 to use mean thresholding. Accordingly, if a pixel's value/color is above a certain mean threshold value it is represented by a 1 and if a pixel's value/color is below the certain mean threshold value the pixel is represented by a 0. This is shown graphically in FIGS. 5A-5D where shaded boxes depict "1" pixels and blank boxes depict "0" pixels. The quantized pixels may be referred to as representative pixels. As mentioned above, the representative pixels may be stored in temporary storage 422 of memory 420. In general, the representative pixels help processor 410 divide the pixels into background pixels (0, blank boxes in FIGS. 5A-5D) or object pixels (1, shaded boxes in FIGS. 5A-5D). For example, using instructions from program 421, processor 410 may be able to use the quantized values for each pixel within an observation window to identify edge locations based on transitions from 0 to 1 or 1 to 0 in the quantized value of two adjacent pixels. Processor 410 may also be able to determine the number of zero mean crossings of a particular row within the observation window. The information related to both the edge locations and the number of zero mean crossings may also be stored by temporary storage 422.

Using the information that is now stored in temporary storage 422 along with the information and instructions in reconstruction application 426, processor 410 may be able to determine if a particular pixel comprises a motion tear artifact. In general, processor 410 is looking for pixels in which: Lines from either the top field-paired lines or the bottom field-paired lines contain a high contrast horizontal edge (tearing artifacts are most visible on edge boundaries); field-paired lines have the same edge orientation (e.g., 0 to 1 or 1 to 0); and/or the difference between means for field-paired lines is low.

Reconstruction application 426 may specify for processor 410 to use any of a variety of different techniques and tests to determine whether a particular pixel comprises a motion tear artifact. In the depicted embodiment, reconstruction application 426 includes classifiers 425 which processor 410 may use when identifying motion tear artifacts. Classifier 425 may store the conditions or rules for each of classifiers 425a-425d. Processor 410 may then use these different types of classifiers to detect different types of motion tear artifacts occurring in different situations. If processor 410 detects a motion tear artifact using any type of classifier the pixel is simply noted as comprising a motion tear artifact. In other words, the fact that a pixel has a motion tear artifact may be of more value than the specific type of motion tear artifact of the pixel. The fact that a pixel contains a motion tear artifact may be stored in temporary storage 422.

Figure 5A:
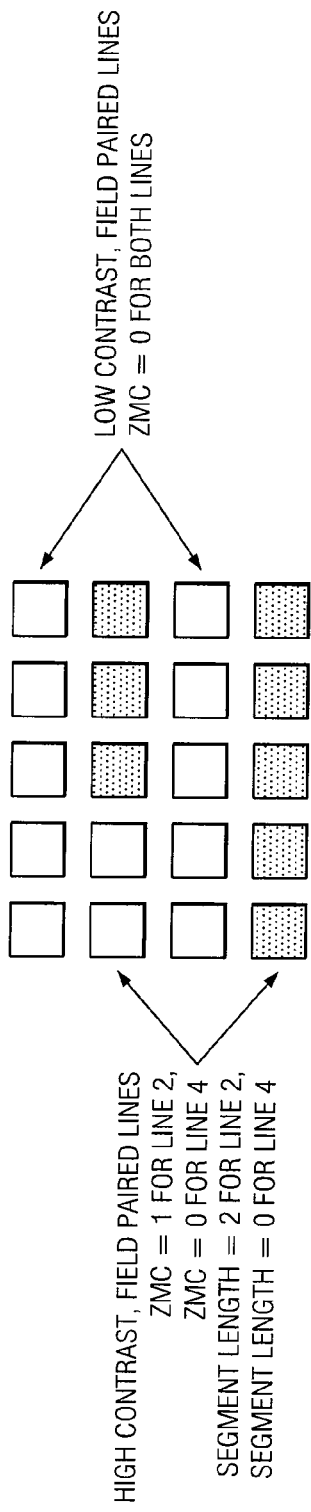
FIGS. 5A-5D are block diagrams illustrating examples of particular types of motion tears, in accordance with particular embodiments.

Flat classifier 425a may be used to detect fast motion of an object on a low contrast background. This may be referred to as a flat or combining motion tear artifact. An example of the type of motion tear artifact that may be detected using flat classifier 425a is shown in FIG. 5A. In general, a flat motion tear artifact may be detected when one set of field-paired lines contains a zero mean crossing of zero and the other set of field-paired lines has a zero mean crossing less than or equal to one. Additionally, the segment length, the minimum distance on either side of an edge, is greater than one for the high contrast, field-paired lines.

Figure 5B:
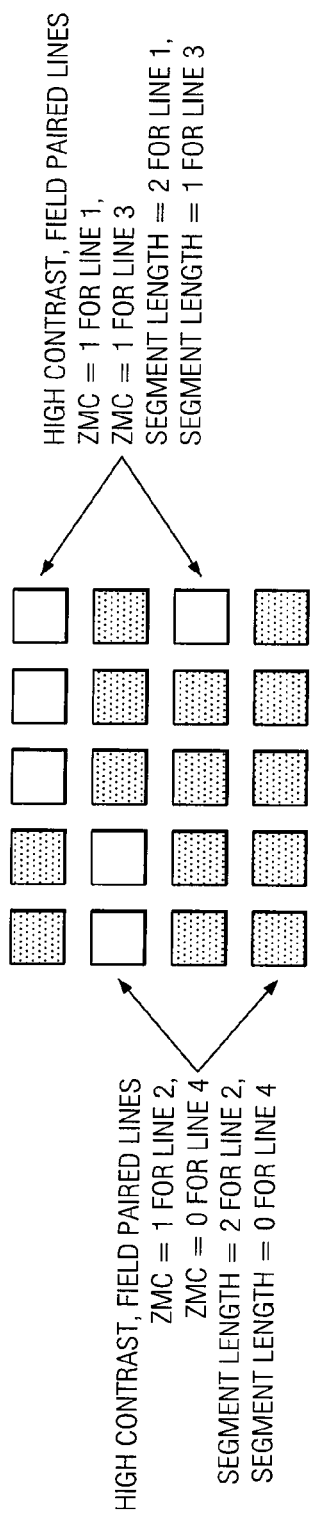

Swapped classifier 425b may be used to detect fast motion across two high contrast objects. This may be referred to as a swapped polarity motion tear. An example of the type of motion tear artifact that may be detected using swapped classifier 425b is shown in FIG. 5B. In general, a swapped polarity motion tear artifact may be detected if the number of zero mean crossings for every line is less than or equal to one, and the segment length of at least one field-paired line is greater than one. Additionally, the edge orientation between fields is swapped.

Figure 5C:
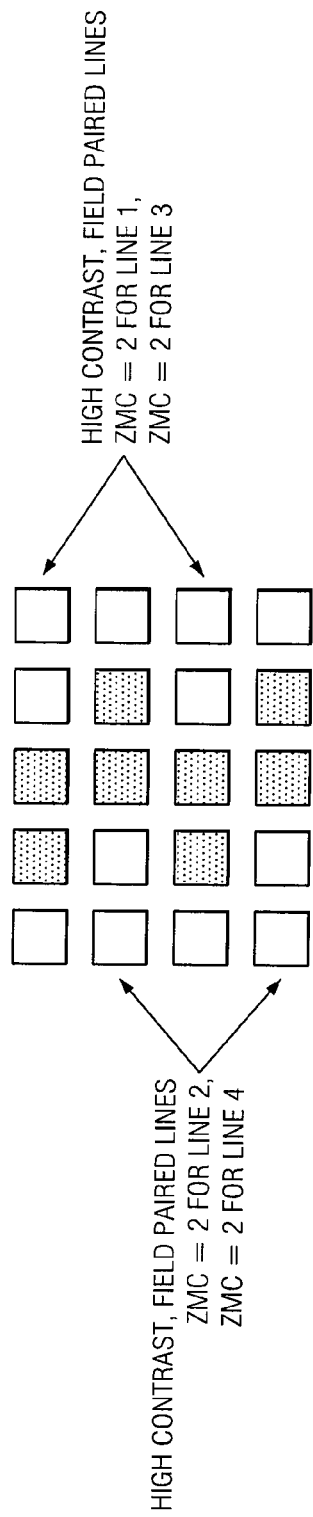

Zipper classifier 425c may be used to detect slow motion across two high contrast objects. This may be referred to as a zipper motion tear. An example of the type of motion tear artifact that may be detected using zipper classifier 425c is shown in FIG. 5C. In general, a zipper motion tear artifact may be detected if a high contrast 90° edge is present on both field-paired lines, and the difference between edge locations between fields is one pixel. Additionally, the number of zero mean crossings for each line is less than or equal to two.

Figure 5D:
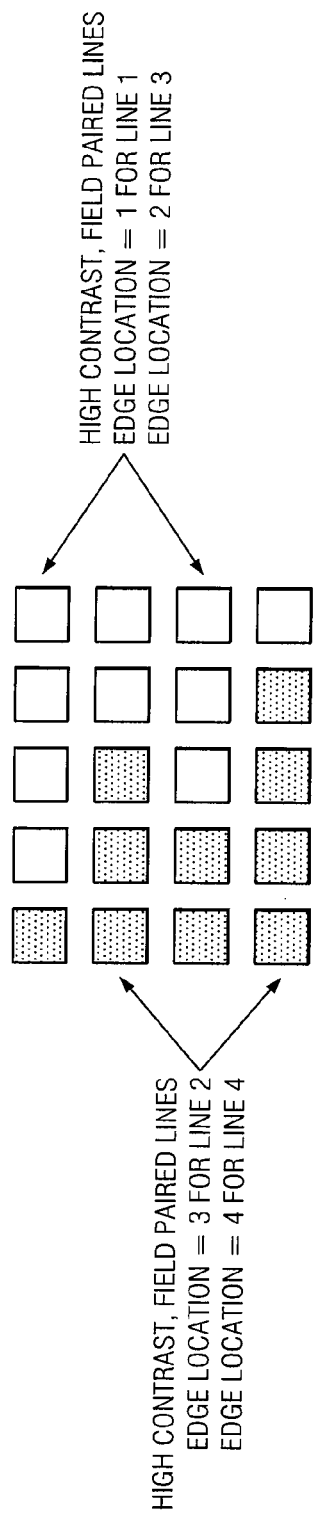

Shear classifier 425d may be used to detect slow motion across a single high contrast object. This may be referred to as a shear motion tear. An example of the type of motion tear artifact that may be detected using shear classifier 425d is shown in FIG. 5D. In general, a shear motion tear artifact may be detected if a high contrast edge is present on both field-paired lines. Also, the position of the edge locations is not bounded or there is a vertical high frequency structure present. Edge locations may not be bounded if the edge position of line 2 is not within the edge positions of lines 1 and 3, or the edge position of line 3 is not within edge positions of lines 2 and 4. A vertical high frequency structure may be detected if the lines alternate between high and low values or vice versa. Lastly, the edge orientations match for all lines, and the number of zero mean crossings for each line is less than or equal to one.

Once processor 410 has analyzed each pixel of a particular video field using classifiers 425, it may use instructions in program 421 to determine the sum of the number of motion tear artifacts for the video field (this may be referred to as the field's motion tear score or motion tear level). The motion tear scores for the current video field and previous video field may be compared to one another. If the current motion tear score is less than the previous motion to tear score, the field is assigned a low (O) designation otherwise it is assigned a high (1) designation. In particular embodiments a high motion tear score may be twice as high as a low motion tear score. In some embodiments, program 421 may use the following relational test to set the designation D(T) for a particular pixel: $D(T)=A(T)>Z*A(T-1)$ where $A(T)$ is the current motion tear score; $A(T-1)$ is the previous motion tear score; and Z is set for some value slightly over unity (e.g., 1.15). The representation of the motion tear score may be stored in temporary storage 422. Reconstruction application 426 may specify that the analysis and summation described above be repeated for each video field so that a pattern of motion tear scores may be determined.

In a 2:2 pull-down the pattern may look like 1,0,1,0,1,0,1 . . . ; in a 3:2 pull-down the pattern may look like 1,0,0,1,0,1, 0,0,1,0 . . . . In other words, a video field may be represented by a 1 if the previous video field is from a different frame or it may be represented by a 0 if the previous video field is from the same frame. From the pattern of motion tear scores, video processor 400 may be able to determine the cadence of the source material and thus how best to combine the video fields, if at all. As indicated above, some material may be inherently interlaced. Accordingly, upon video processor 400 determining that there is no cadence it may proceed to create a progressive frame using any of a variety of known techniques (e.g., as taught in U.S. Pat. No. 7,375,760 which is incorporated herein by reference). In particular embodiments, video processor 400 may be able to make the determination approximately every other field. This may allow video processor 400 to quickly adapt to changes in the cadence of the source material.

Figure 6:
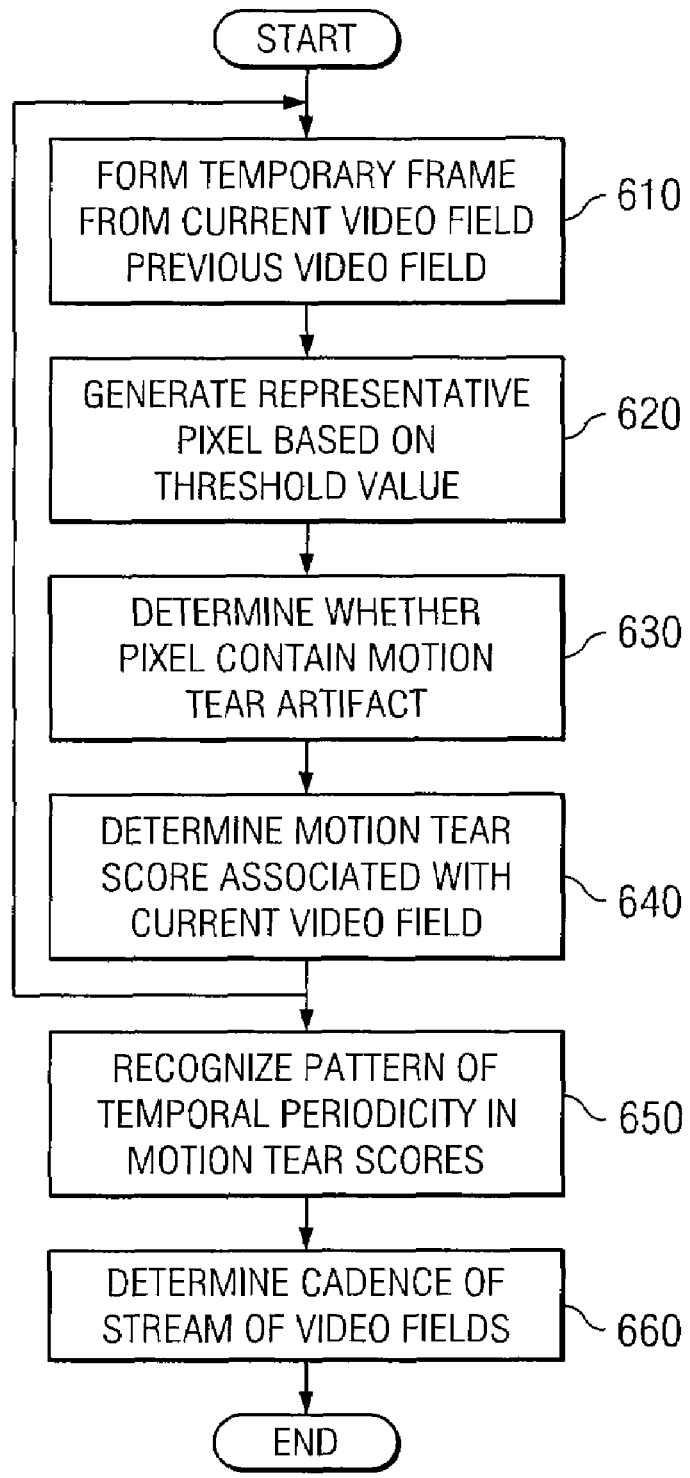
FIG. 6 is a flowchart illustrating a method for reconstructing a film source, in accordance with particular embodiments.

FIG. 6 is a flowchart illustrating a method for reconstructing a film source, in accordance with particular embodiments. For purposes of this method it may be assumed that the film source has been converted to a video source. Furthermore, it may be assumed that the video source contains a stream of interlaced video fields originating from an inherently progressive source. It may also be assumed that a video processor is functionally located between the video source and a progressive video display device such that the video processor is able to de-interlace the interlaced video fields prior to being sent to the display device. Additionally, it may be assumed that the method is used with an embodiment having a reconstruction application similar to reconstructing application 426 described above with respect to FIG. 4.

The method begins at step 610 where a temporary frame is formed from a current video field and a previous video field. As mentioned above both the previous video field and the current video field are interlaced video fields. In other words, one of the fields may comprise even numbered lines while the other field may comprise odd numbered lines. Thus, the temporary frame may have all the pixels of a progressive video frame.

As step 620 representative pixels are generated based on a threshold value. Each pixel of the temporary frame may be represented by its own representative pixel. The representative pixel may be one of two values depending on whether or not the respective pixel from the temporary frame has a color value above or below a threshold value. More specifically, each pixel of the temporary frame having a value above the threshold value may be represented by a representative pixel having a first indicator value and each pixel of the temporary frame having a value below a threshold value may have a representative pixel having a second indicator value. The first and second indicator values may be different. For example, in particular embodiments the first and second indicator values may comprise a "1" and "0". Both the first and second indicator values comprise less data than the original pixels from the temporary frame. Accordingly, this may reduce the amount of data needed to be processed to determine the existence and/or extent of any motion tear artifacts.

At step 630 a determination is made as to whether each pixel of the current video field contains a motion tear artifact. This determination may be made using representative pixels from both the current and previous video fields of the temporary frame. While pixels from both fields are used, it is only the pixels from the current video field that are being assessed. In making the determination an observation window may be used that includes a subset of the entire set of pixels from the temporary frame (e.g., a four pixel by five pixel block of representative pixels). The observation window may be centered on a particular representative pixel. The observation window may include some pixels from the current video field and some pixels from the previous video field. The arrangement/pattern of the first and second indicator values of the representative pixels within the observation window may be analyzed. For example, fuzzy logic may be used to determine whether the arrangement/pattern indicates the presence of a motion tear artifact. If the arrangement/pattern indicates a motion tear artifact, then the pixel on which the observation window is centered is classified as having a motion tear artifact. Any of the fuzzy logic classifiers discussed above (as well as any other desired fuzzy logic classifiers) with respect to FIG. 4 may be used to determine the presence of a motion tear artifact.

At step 640 a motion tear score associated with the current video field is determined. The motion tear score may be based, in part, on the number of motion tear artifacts within the current video field. The motion tear score may be represented by one of two indicators. More specifically, if the motion tear score of the current video field is greater than a motion tear score for a previous video then a first indicator value may be used and if the motion tear score is less than the motion tear score for the previous video field then a second indicator may be used. In particular embodiments, the first indicator value may be used when the motion tear score for the current video field is twice as high as the motion tear score for the previous video field, otherwise the second indicator value may be used. Steps 610 through 640 may be repeated for each video field of the stream of video fields.

At step 650 a pattern of temporal periodicity in motion tear scores may be recognized. This pattern may be formed by the repeated execution of step 610 through 640. From the pattern recognized at step 650 the cadence of the stream of video fields may be determined at step 660. Because, the pattern of temporal periodicity is updated with each new video field, any change in the cadence of the stream of video fields may be quickly recognized.

Although particular embodiments of the method and system of the present disclosure have been illustrated in the accompanying drawings and described in the foregoing detailed description, it will be understood that the disclosure is not limited to the embodiments disclosed, but is capable of numerous rearrangements, modifications, and substitutions without departing from the spirit of the disclosure as set forth and defined by the following claims.

What is claimed is:

1. A method, comprising:

forming a temporary frame by combining a current video field of a stream of interlaced video fields with a previous video field from the stream of interlaced video fields, wherein each interlaced video field comprises a plurality of pixels, each pixel having a color value;

generating a representative pixel for each pixel of the temporary frame, each representative pixel comprising a single bit, wherein a representative pixel for a particular pixel comprises a first indicator value upon the particular pixel having a color value greater than a threshold value and wherein the representative pixel for the particular pixel comprises a second indicator value upon the particular pixel having a color value less than the threshold value, wherein the second indicator value is different than the first indicator value;

determining whether at least one pixel within the current video field contains a motion tear artifact by analyzing the at least one pixel using fuzzy logic, wherein the analysis comprises using an observation window comprising a first number of representative pixels of the temporary frame, the first number of representative pixels comprising at least one representative pixel associated with the at least one pixel within the current video field and at least one representative pixel from the previous video field;

determining a motion tear score associated with the current video field based on the number of motion tear artifacts within the current video field;

recognizing a pattern of temporal periodicity in the motion tear scores for the stream of video fields by comparing the motion tear score associated with current video field to a motion tear score associated with a subsequent video field; and determining the cadence of the stream of video fields based on the pattern of temporal periodicity in the motion tear scores.

2. A computer program stored in a non-transitory computer readable medium, when executed by a processor, is operable to:

receive a stream of interlaced video fields;

create a temporary video frame comprised of a plurality of representative pixels, wherein at least a first representative pixel is based on a first pixel from a current video field and at least a second representative pixel is based on a second pixel from a previous video field;

generate a representative pixel for each pixel of the temporary frame, each representative pixel comprising a single bit, wherein a representative pixel for a particular pixel comprises a first indicator value upon the particular pixel having a color value greater than a threshold value and wherein the representative pixel for the particular pixel comprises a second indicator value upon the particular pixel having a color value less than the threshold value, wherein the second indicator value is different than the first indicator value;

determine whether at least one pixel within the current video field contains a motion tear artifact by analyzing the at least one pixel using fuzzy logic, wherein the analysis comprises using an observation window comprising a first number of representative pixels of the temporary frame, the first number of representative pixels comprising at least one representative pixel associated with the at least one pixel within the current video field and at least one representative pixel from the previous video field;

determine a motion tear score for the current video field using the plurality of representative pixels; compare the motion tear score for the current video field with a motion tear score for the previous video field; and determine the cadence of the stream of interlaced video fields by a pattern of temporal periodicity determined from the comparison of motion tear scores.

3. The computer program stored in a non-transitory computer readable medium of claim 2, wherein the code operable to determine a motion tear score for the current video field using the plurality of representative pixels comprises code operable to:

for each pixel of the current video field, determine whether a current pixel contains a motion tear artifact; and determine a motion tear score for the current video field based on the number of pixels of the current video field that contain a motion tear artifact.

4. The computer program stored in a non-transitory computer readable medium of claim 3, wherein the code operable to determine whether a current pixel contains a motion tear artifact comprises code operable to:

create an observation window comprised of a subset of the plurality of representative pixels centered around the current pixel; and apply at least one fuzzy logic classifier to the subset of the plurality of representative pixels to determine if the current pixel contains a motion tear artifact.

5. The computer program stored in a non-transitory computer readable medium of claim 2, wherein the code is further operable to create the plurality of representative pixels based on a threshold value wherein upon a pixel's value being greater than the threshold value the pixel's representative pixel comprises a first indicator and upon the pixel's value being less than the threshold value the pixel's representative pixel comprises a second indicator.

6. The computer program stored in a non-transitory computer readable medium of claim 2, wherein the code operable to compare the motion tear score for the current video field with a motion tear score for the previous video field comprises code operable to:

upon the motion tear score of the current video field being at least twice as large as the motion tear score of the previous video field, a comparison score associated with the current video field comprises a first value; and upon the motion tear score of the current video field being less than twice as large as the motion tear score of the previous video field, a comparison score associated with the current video field comprises a second value.

7. The computer program stored in a non-transitory computer readable medium of claim 6, wherein the code operable to determine the cadence of the stream of interlaced video fields by a pattern of temporal periodicity determined from the comparison of motion tear scores comprises code operable determine whether the stream of interlaced video fields comprises a stream of inherently interlaced video fields without a cadence.

8. A method comprising:

identifying motion tear artifacts within a plurality of video fields of a stream of video fields by analyzing the video fields using fuzzy logic;

comparing the analysis of one video field to the analysis of an immediately preceding video field to determine whether there is a relatively high level of motion tear artifacts within the video field or a relatively low level of motion tear artifacts within the video field;

generating a representative pixel for each pixel of the temporary frame, each representative pixel comprising a single bit, wherein a representative pixel for a particular pixel comprises a first indicator value upon the particular pixel having a color value greater than a threshold value and wherein the representative pixel for the particular pixel comprises a second indicator value upon the particular pixel having a color value less than the threshold value, wherein the second indicator value is different than the first indicator value;

determining whether at least one pixel within the current video field contains a motion tear artifact by analyzing the at least one pixel using fuzzy logic, wherein the analysis comprises using an observation window comprising a first number of representative pixels of the temporary frame, the first number of representative pixels comprising at least one representative pixel associated with the at least one pixel within the current video field and at least one representative pixel from the previous video field;

identifying a pattern of temporal periodicity for the comparisons; and determining the cadence of the stream of video fields based on the pattern of temporal periodicity.

9. The method of claim 8, wherein analyzing the video fields comprises analyzing a plurality of interlaced video fields of a stream of interlaced video fields, each interlaced video field associated with a film frame, wherein the film frame has at least two video fields associated therewith.

10. The method of claim 8, wherein determining the cadence of the stream of video fields comprises determining if the stream of video fields was created from a progressive source or an interlaced source.

11. The method of claim 10, wherein determining the cadence of the stream of video fields comprises, upon the stream of video fields being created from a progressive source, determining a pull-down technique used to create the stream of video fields from the progressive source.

12. The method of claim 8, wherein comparing the analysis of one video field to the analysis of an immediately preceding video field to determine whether there is a relatively high level of motion tear artifacts within the video field or a relatively low level of motion tear artifacts within the video field comprises comparing the analysis of one video field to the analysis of an immediately preceding field to determine whether the level of motion tear artifacts within the one video field is twice as much as the level of motion tear artifacts within the immediately preceding video field.

13. The method of claim 8, wherein analyzing the video fields using fuzzy logic comprises analyzing each pixel of a plurality of pixels of the plurality of video fields using fuzzy logic to identify motion tear artifacts within each pixel of the video fields.

14. An apparatus comprising:
an interface operable to receive a stream of interlaced video fields;
a processor coupled to the interface and operable to:
generate a representative pixel for each pixel of the temporary frame, each representative pixel comprising a single bit, wherein a representative pixel for a particular pixel comprises a first indicator value upon the particular pixel having a color value greater than a threshold value and wherein the representative pixel for the particular pixel comprises a second indicator value upon the particular pixel having a color value less than the threshold value, wherein the second indicator value is different than the first indicator value;
determine whether at least one pixel within the current video field contains a motion tear artifact by analyzing the at least one pixel using fuzzy logic, wherein the analysis comprises using an observation window comprising a first number of representative pixels of the temporary frame, the first number of representative pixels comprising at least one representative pixel associated with the at least one pixel within the current video field and at least one representative pixel from the previous video field;
determine a motion tear score for each interlaced video field based on the number of motion tear artifacts within each respective interlaced video field; and
recognize a pattern in the motion tear scores, the pattern indicative of a first cadence of the interlaced video fields; and
wherein the interface is further operable to transmit a stream of progressive video frames wherein each progressive video frame comprises two interlaced video fields from the stream of interlaced video fields combined based on the first cadence.

15. The apparatus of claim 14, wherein the processor is further operable to create a temporary video frame by combining a current video field with a previous video field.

16. The apparatus of claim 15, wherein the processor is further operable to create a representative pixel for each individual pixel of the temporary video frame, the representative pixel based on the respective value of each individual pixel.

17. The apparatus of claim 16, wherein the processor is further operable to apply at least one fuzzy logic classifier to assess whether a first pixel of the current video field comprises a motion tear artifact.

18. The apparatus of claim 17, wherein the processor operable to apply at least one fuzzy logic classifier to assess whether the first pixel of the current video field comprises a motion tear artifact comprises a processor operable to apply the at least one fuzzy logic classifier to a subset of representative pixels from both the current video field and the previous video field to assess whether the first pixel of the current video field comprises a motion tear artifact, the subset of representative pixels centered around the respective representative pixel of the first pixel being assessed.

19. The apparatus of claim 18, wherein the processor is further operable to assess each pixel of the current video field.

20. The apparatus of claim 17, wherein the fuzzy logic classifier is selected from a group consisting of a flat motion tear classifier, a shear motion tear classifier, a zipper motion tear classifier, and a swapped motion tear classifier.

\* \* \* \* \*